United States Patent
Boyd et al.

(10) Patent No.: US 6,460,992 B1
(45) Date of Patent: *Oct. 8, 2002

(54) INK JET TEXTILE PRINTING APPARATUS AND METHOD

(75) Inventors: Melissa D. Boyd; Lawrence R. Plotkin, both of Corvallis, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/637,569

(22) Filed: Apr. 25, 1996

(51) Int. Cl.[7] .............................. B41J 2/01; B41J 3/407
(52) U.S. Cl. .................. 347/106; 347/101; 347/103
(58) Field of Search ................... 347/96, 43, 103, 347/101, 106

(56) References Cited

U.S. PATENT DOCUMENTS

| | | | |
|---|---|---|---|
| 3,952,131 A | 4/1976 | Sideman | 428/334 |
| 4,040,779 A | 8/1977 | Loew et al. | 8/2.5 R |
| 4,058,644 A | 11/1977 | DeVries et al. | 428/200 |
| 4,132,833 A | 1/1979 | Sandhu | 428/481 |
| 4,294,641 A | 10/1981 | Reed et al. | 156/234 |
| 4,395,263 A | 7/1983 | Davis | 8/471 |
| 4,664,670 A | 5/1987 | Mehl et al. | 8/470 |
| 4,758,952 A | 7/1988 | Harris, Jr. et al. | 364/300 |
| 4,767,420 A | 8/1988 | Mehl et al. | 8/470 |
| 4,773,953 A | 9/1988 | Hare | 156/240 |
| 4,844,770 A | 7/1989 | Shiraishi et al. | 156/387 |
| 4,966,815 A | 10/1990 | Hare | 428/497 |
| 5,006,502 A | 4/1991 | Fujimura | 503/227 |
| 5,196,030 A | 3/1993 | Akerblom et al. | 8/467 |
| 5,270,507 A * | 12/1993 | Nakamura et al. | 200/511 |
| 5,296,444 A | 3/1994 | Saiki et al. | 503/227 |
| 5,431,501 A | 7/1995 | Hale et al. | 400/120.02 |
| 5,488,907 A * | 2/1996 | Xu et al. | 101/488 |
| 5,568,173 A * | 10/1996 | Leenders et al. | 347/96 |
| 5,635,969 A * | 6/1997 | Allen | 347/96 |
| 5,764,261 A * | 6/1998 | Koike et al. | 347/100 |
| 5,981,045 A | 11/1999 | Kuwabara | 428/212 |

FOREIGN PATENT DOCUMENTS

| | | | |
|---|---|---|---|
| FR | 2521489 | 8/1983 | |
| GB | 2095855 A | 10/1982 | G03B/9/10 |
| GB | 2189436 A | 10/1987 | B41M/3/12 |
| JP | 54-33110 | 3/1979 | |
| JP | 8-2688 | 1/1986 | B41M/5/00 |
| JP | 07145576 A | 6/1995 | |

OTHER PUBLICATIONS

"Kusters Transfer Printing Machine" Brochure, By: Kusters of Milano–Itma '95—Milano–Halle 7/1, Oct. 1995.
"Cotton Art—Dansk Reactive Transfer Printing On Natural Fibers" Brochure, By: Cotton Art–Dansk of Denmark, Marsvej 7–9, DK–7430 Ikast, Denmark.
Jeffries, Walter V., Serendipity –How To Stay Busy Without Even Trying, Flash Magazine, Sep. 1995, pp. 8–9.

* cited by examiner

Primary Examiner—Anh T. N. Vo
Assistant Examiner—An H. Do

(57) ABSTRACT

A method of printing includes coating a transfer sheet with a first ink component that has an ink thickener; and operating an ink jet printing apparatus to emit a second ink component onto the transfer sheet to form a thickened resulting ink in a selected pattern. The second ink component has a selected dye and a selected solvent in which the thickener is soluble.

23 Claims, 2 Drawing Sheets

INK JET TEXTILE PRINTING APPARATUS AND METHOD

FIELD OF THE INVENTION

This invention relates to textile printing, and more particularly to textile printing with an inkjet printer.

BACKGROUND

Textile printing generally requires a substantial investment in time and resources to set up printing screens for a single production run of material. Switching printing machinery to production of a different design requires similar investments, and revising a design also entails the cost to produce new screens.

To permit short production runs and prototyping of designs without major investment, printing systems have been developed that employ computer printers to generate a pattern of thermally-activated dye-bearing ink on a transfer surface, which is later applied to textile material in conjunction with high temperatures to activate the dye. This permits nearly instantaneous creation and revision of designs in the form of printable multicolor transfer sheets, with out the preparation of conventional printing screens. When the printer is a thermal ink jet printer, printing occurs at temperatures below that which would activate the dye. Thermally-activated dyes are suitable only for printing synthetic fabrics, and are unsuitable for natural fibers such as cotton, which do not absorb the dyes fully, and which therefore produce an unacceptably faded print.

Cotton and other natural fiber or cellulosic fiber textiles are normally printed with reactive dyes by screening the reactive ink pastes directly onto dry fabric, which typically will have been pretreated with an alkali solution or comparable pretreatment. The fabric is then typically heat treated with steam to cause the dyes to bond with the fabric.

SUMMARY

A method of printing includes coating a transfer sheet with a first ink component that has an ink thickener; and operating an ink jet printing apparatus to emit a second ink component onto the transfer sheet to form a thickened resulting ink in a selected pattern. The second ink component has a selected dye and a selected solvent in which the thickener is soluble.

Many of the attendant features of this invention will be more readily appreciated as the same becomes better understood by reference to the following detailed description and considered in connection with the accompanying drawings in which like reference symbols designate like parts throughout.

DETAILED DESCRIPTION

A low temperature alkali-activated technique of transfer printing with reactive dyes has been developed to reduce equipment and setup costs, and to facilitate prototyping to a limited degree. With this technique, multiple colors of reactive dyes may be sequentially printed onto transfer sheets having non-cellulosic surfaces, then transferred later onto alkali-wetted textile, either in limited quantities for prototyping, or large quantities for production. To avoid bleeding on contact with the wetted textile and absorbent natural fibers, reactive dyes are thickened to increase their viscosity. The use of alkali solution permits the transfer to occur at cool temperatures; water may be used if high temperatures are used to activate the dyes in a traditional manner. This transfer printing process avoids the costs to set up screens for printing dye directly to the textile, but still requires screens to be prepared for printing of the transfer sheet. Such a low temperature alkali-activated reactive dye transfer printing system is disclosed in U.S. Pat. No. 5,196,030, which is incorporated by reference herein. Existing computer printers, including ink jet printers, are believed to be incapable of printing inks of the elevated viscosity required for this type of reactive dye printing, preventing the rapid and flexible prototyping of reactive-dyed textiles.

Figure 1:
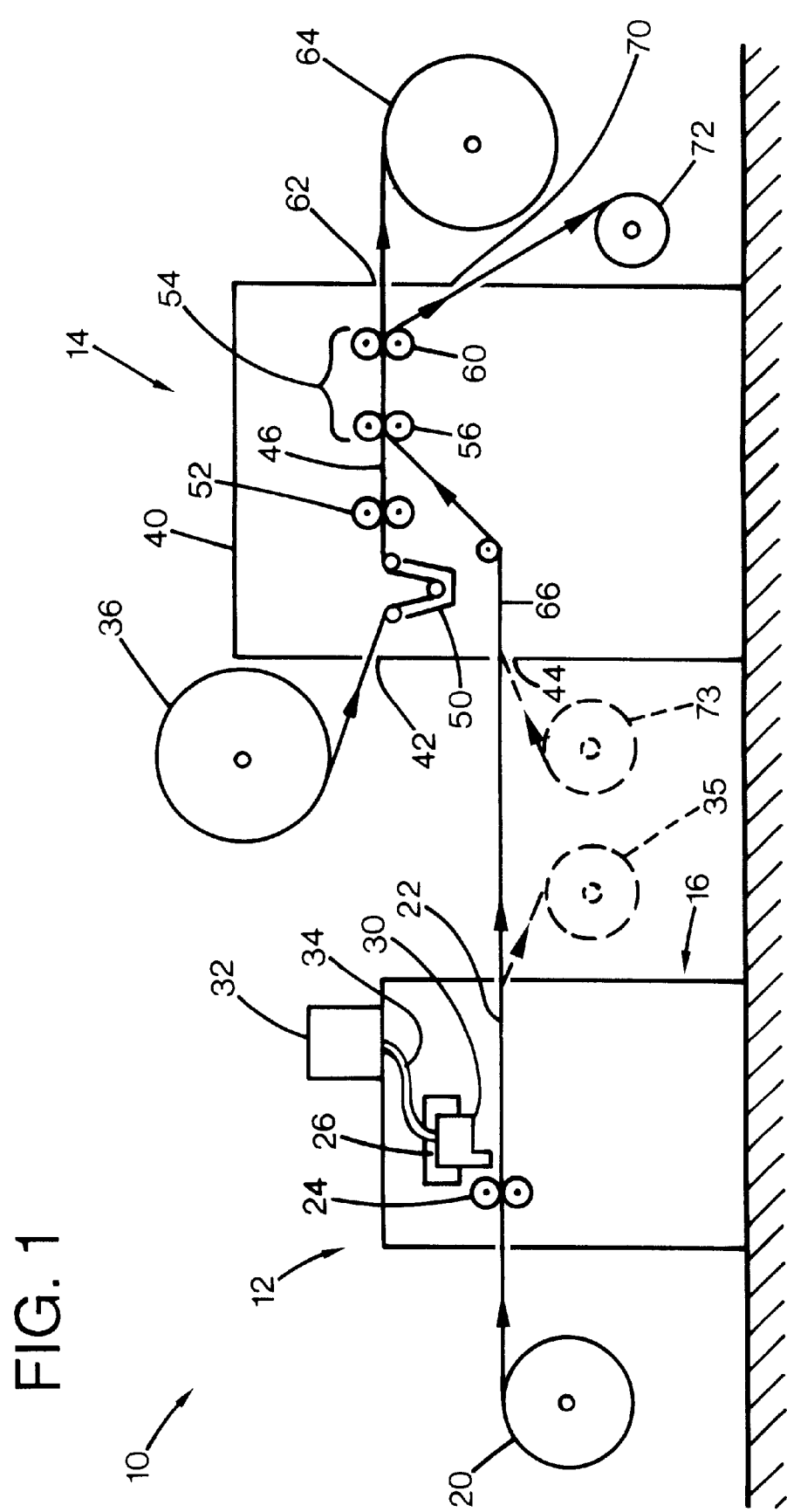
FIG. 1 is a simplified schematic diagram of an apparatus according to a preferred embodiment of the invention.

FIG. 1 shows a textile printing system including an ink jet printing apparatus 12 and a pattern transfer apparatus 14. The ink jet printing apparatus includes a housing 16 providing a frame supporting a supply of coated transfer paper 20. The housing defines a paper path 22 that passes through the housing, and which is positioned to receive sheets or a continuous supply of the transfer paper 20. A sheet advance mechanism 24 is shown schematically as a pair of feed rollers on opposite sides of the paper path and contacting each other at a nip. Although the transfer sheet is shown as a roll, it may also be provided in single discrete leaves, in the manner of a conventional computer printer.

A carriage 26 is mounted within the housing adjacent to the paper path, and is operable to reciprocate across the width of the transfer sheet, in and out of the plane of the figure. The carriage 26 supports a multicolor ink pen 30, or several ink pens of different colors. In the preferred embodiment, the pen or pens contain the colors cyan, magenta, yellow, and black. In alternative embodiments, the pens may be provided with particularly prepared "spot" colors that may be printed singly without requiring the blending of the traditional primary ink colors. A six pen, six color hexachrome printing system may alternatively be employed.

The inks printed by the ink jet pens are low viscosity, water based, and are colored preferentially with reactive dyes that bind effectively to fabric containing natural fibers such as cotton, silk, wool, hemp, and the like. Such reactive dye bonding occurs when the combination of liquid ink and wetted transfer sheet coating contacts a fabric that has been wetted with an alkali solution. While thermally activated dyes require elevated temperatures, the low temperature alkali-activated reactive dye printing process as described above does not. However, an alternative embodiment may use a water transfer process in conjunction with high temperatures. Further, other types of colorants such as acid dyes and direct dyes may also be used in alternative embodiments.

A separate large ink reservoir 32 may be provided for each ink color, and mounted to a stationary portion of the housing 16. A flexible hose 34 may connect the stationary reservoir and the reciprocating ink jet pen 30. Alternatively, the pen may be provided with a sensor that detects when it is low on ink, so that the pen may move to a refilling station connected to a larger reservoir. The remote mounting of the large reservoir avoids the need to refill or replace ink pens during the printing of a large pattern, and permits the carriage to remain a low mass structure that may be rapidly reciprocated for efficient high speed printing. Alternatively, a stationary full width ink jet array may be used for high volume printing, with the array of nozzles extending across the entire width of the sheet to be printed.

A workstation (not shown) is connected to the printer to input and program the desired patterns and designs, and to control printer operation.

The printer output may be collected, stored, and/or transported to another location for later transfer to fabric, or may be fed directly to the pattern transfer apparatus 14 in a continuous process as shown. In most applications, the printing and transfer operations will be done in separate rooms, often by separate companies located remotely from each other.

For clarity and simplicity, a continuous process is shown. In actual practice, the throughput rate of transfer process is significantly faster than throughput rate of the ink jet printing process. Thus, to avoid idling expensive transfer apparatus, an integrated operation might employ several ink jet apparatus for each transfer apparatus, or it might operate the ink jet apparatus during more shifts per day than the transfer apparatus. In either case, the ink jet apparatus may be provided with a take up roll 35 or output tray for collecting and stockpiling printed transfer sheets in roll or sheet form to be later transferred rapidly in a single batch.

The transfer apparatus 14 is a conventional apparatus for reactive dye transfer printing, as discussed above in the Background and Summary of the Invention. A supply roll 36 of an unprinted textile web is mounted to a transfer apparatus housing 40 that defines a textile inlet 42 and a transfer sheet inlet 44. The housing 40 defines a fabric path 46 that passes through inlet 42, then dips downward into a trough 50 of alkali liquid, through a pair of squeeze rollers 52. The fabric path then continues straight through a transfer region 54 beginning with a first pair of transfer rollers 56, and ending with a second pair of transfer rollers 60. The fabric path exits the housing through a fabric exit aperture 62, and continues toward a fabric take up roll 64 mounted to the exterior of the housing.

The transfer apparatus defines a transfer sheet path 66 that enters the housing 40 through inlet 44, and is directed into the transfer region, where it passes through roller pairs 56 and 60 along with the fabric path 46. The transfer sheet path 66 then splits from the fabric path, exits via a transfer sheet aperture 70, and continues toward a transfer sheet waste take up roll 72 mounted to the exterior of the housing. A transfer sheet supply roll 73 may be mounted adjacent the inlet 44 for holding a supply of printed transfer sheets when a direct feed of sheets from one machine to the other is not desired.

Figure 2:
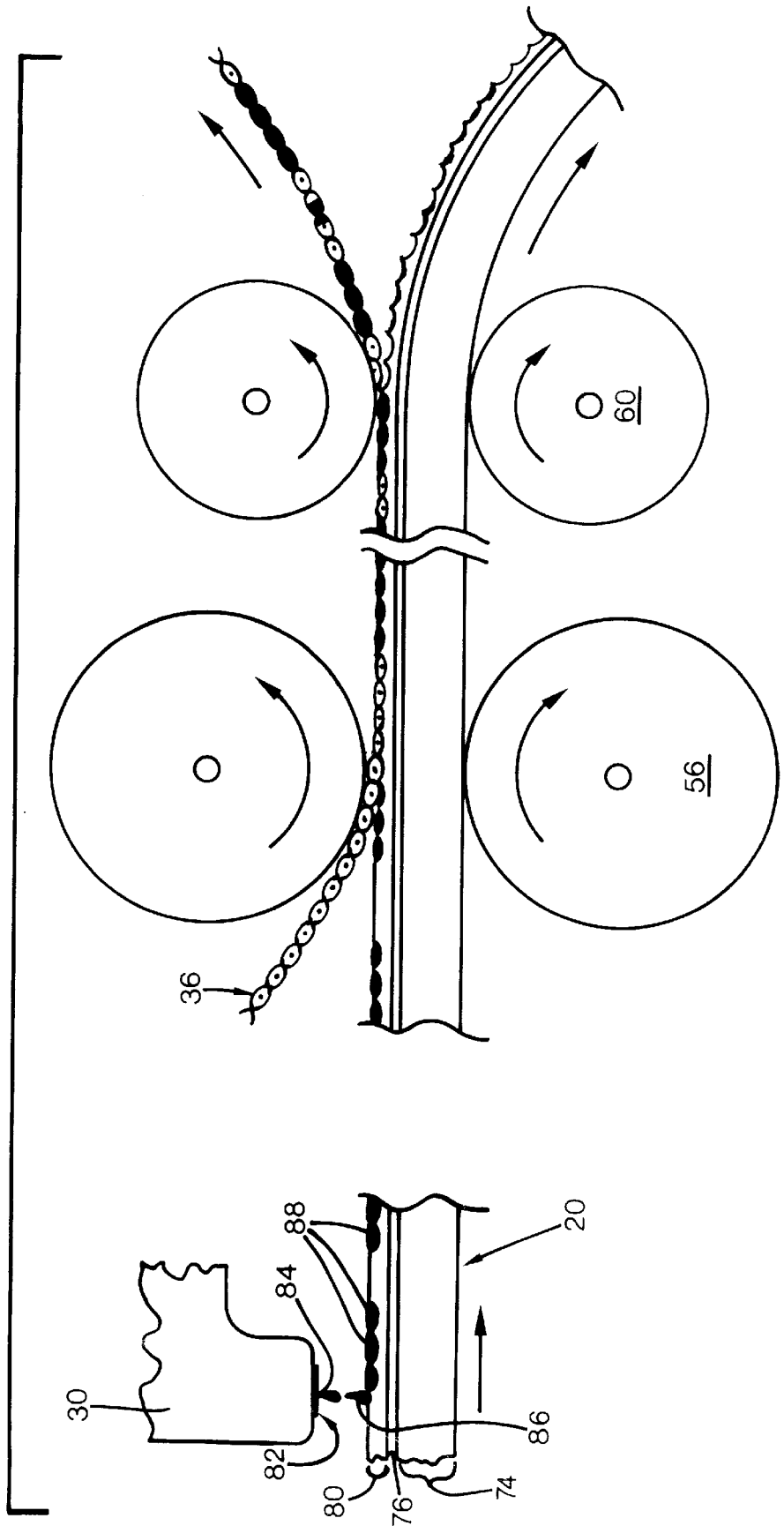
FIG. 2 is an enlarged sectional view showing the sequence of operations.

As shown in FIG. 2, the transfer sheet has a paper substrate 74, a plastic film 76 covering the entire surface of the paper, and an ink thickener layer 80 on top of the plastic film. The surface (or plastic) film 76 may be any non-cellulosic or synthetic material such as a polymer, metal foil, wax, or plastic coated fiber mat. Cellulosic materials such as wood fiber and cotton are undesirable because of their tendency to react with reactive dyes or colorants, which are formulated to react effectively and bind with cotton fabric. Thus, the upper surface should be a different material having different ink reactivity characteristics from the textile material; ink should not react with the transfer sheet, but should react well with the textile.

In an alternative embodiment, the substrate may be entirely formed of a plastic or other synthetic material that is essentially inert with respect to reactive dyes or the colorants, eliminating the need for coated paper. The coating is a dried film of a thickener that is readily soluble by water or other solvent provided in the printer ink or moistened fabric. Alternatively, the transfer sheet may be coated with a wet film of the thickener immediately prior to printing, although ink components would need to be carefully selected to avoid bleeding.

The thickener is transparent or neutral colored, without any colorants. Suitable thickeners include sodium alginate or other alginates, carboxymethylcellulose, non-ionic water soluble polymers, cationic and anionic water soluble polymers, natural gums such as xanthan gum and carrageenan, and pectin.

The ink jet pen 30 includes a print head 82 that defines an array of orifices 84 through which ink droplets 86 are ejected onto the sheet 20. Suitable inks include any of the wide range of commercially available reactive, direct, or acid colorants such as those disclosed in U.S. Pat. No. 5,196,030, dissolved or suspended in a fluid base of water, non-aqueous solvents, co-solvents and surfactants. Upon contact with the thickener layer 80, each droplet either dissolves a small localized portion of the thickener, thereby creating a pixel 88 of thickened liquid or wet paste ink or is absorbed, or is absorbed locally to form a dyed pixel. Essentially, the thickener film 80 provides a first ink component, and the jetted ink 86 provides a second ink component to form the resulting ink pixel 88.

The ink droplets 86 are distributed in a spaced-apart array on a grid or other pattern so that the resulting pixels are closely adjacent. In other words, operating the ink jet printing apparatus includes generating a raster image of the selected pattern, and expelling an array of ink droplets to correspond to the raster image. To provide saturated colors, slight overlap will avoid transparent of white interstitial spaces between pixels. Greater or total overlap may be deliberately employed to create process color by mixing different colors of ink. The Different colors of ink droplets are printed in a sequence that permits the droplets of earlier-printed colors to stabilize and be absorbed momentarily before later colors are printed onto adjacent or overlapping pixels to avoid uncontrolled color bleed. After the transfer sheet is printed with all colors, it is dried and fed directly to the transfer apparatus 14, or may be stored or shipped after drying.

To transfer the printed pattern, the transfer sheet 20 is fed through transfer roller pair 56 in conjunction with wetted fabric 36, with the printed side of the transfer sheet facing the fabric. The moisture in the fabric is at 50–80% saturation (preferably about 55%) after passing through the squeezing rollers 52, so that the fabric has sufficient moisture to largely dissolve the dried printed image without thinning the resulting ink excessively. The remoistened transfer sheet gives up the resulting ink readily to the cotton or other fibers of the fabric. The ink is still sufficiently thick that is does not wick or bleed readily within the fabric. While the transfer sheet may retain a small amount of ink, the majority of the ink is transferred to the fabric. In some embodiments, the unprinted thickener portions need not transfer substantially, but the colored pixels should transfer almost entirely to provide efficient use of colorants.

After passing through the entire transfer region 54 and through roller pair 60, a contact time as little as two seconds, at a throughput rate of 30 meters per minute, the fabric and transfer sheet are split and collected on their respective take-up rolls. Over a period of about 10 hours at room temperature, the colorants fuse with the fabric, which may then be washed to remove the thickening components without removing the fused colorants.

A method of printing a selected pattern onto a textile material includes positioning a transfer sheet coated with a first ink component adjacent an ink jet printing apparatus, operating the ink jet printing apparatus to emit onto the transfer sheet a second ink component containing a selected dye or dye mixture, to form the selected pattern on the transfer sheet, and applying the transfer sheet to the textile material to transfer some of both the first and second ink components to the textile material. The method may be employed by an ink jet printing apparatus having a sheet path, a supply of transfer sheets, a sheet advance mechanism adjacent to the sheet path, and a movable carriage supporting an ink jet pen adjacent to the sheet path. The transfer sheets may include a coating of a second ink component while the ink jet pen includes a supply of a first ink component.

While the disclosed apparatus and method are discussed in terms of preferred and alternative embodiments, it will be apparent to those skilled in the art that changes in form and detail may be made therein without departing from the principles, spirit and scope of the invention.

While the present invention has been disclosed with reference to the foregoing specification and the preferred embodiment shown in the drawings and described above, without departing from the spirit and scope of the invention as defined by the appended claims.

What is claimed is:

1. A method of printing a selected pattern onto a textile material comprising the steps:
   providing a transfer sheet including a coating of a first ink component including an ink thickener;
   providing a supply of a second ink component containing a selected dye and a selected solvent in which the thickener is soluble at room temperature, the thickener and second ink component comprising a set of initial ink components, substantially all of the ink thickener in the set of initial ink components being included on the transfer sheet, such that the second ink component contains essentially no thickener;
   positioning the transfer sheet adjacent an ink jet printing apparatus;
   operating the ink jet printing apparatus to emit the second ink component onto the transfer sheet to form a thickened resulting ink in the selected pattern on the transfer sheet; and
   applying the transfer sheet to the textile material to transfer at least a portion of thickener and at least a portion of the second ink component to the textile material, and wherein at least substantially all of the ink thickener transferred to the textile material is derived from the transfer sheet coating.

2. The method of claim 1 including providing a substrate and applying to the substrate a coating of the first ink component to provide the transfer sheet.

3. The method of claim 1 wherein the first ink component is a solid material, and the second ink component is a fluid including a solvent suitable for mixing with the first ink component.

4. The method of claim 1 wherein the first ink component is unpigmented.

5. The method of claim 1 wherein the first ink component contains a thickener.

6. The method of claim 1 wherein the first ink component is a solid material, and the second ink component is a fluid including a solvent suitable for mixing with the first ink component.

7. The method of claim 1 including mixing the first and second ink components to form the resulting ink.

8. The method of claim 7 wherein the resulting ink is thicker than the second ink component.

9. The method of claim 1 wherein operating the ink jet printing apparatus includes generating a raster image of the selected pattern, and expelling an array of ink droplets to correspond to the raster image.

10. The method of claim 1 wherein operating the ink jet printing apparatus includes printing a plurality of different colors of the second ink component to generate the selected pattern.

11. The method of claim 10 wherein applying the transfer sheet to the textile material includes simultaneously transferring all different colors of ink.

12. The method of claim 1 wherein the second ink component includes reactive dyes.

13. The method of claim 1 wherein applying the transfer sheet to the textile material includes wetting the textile material, then applying the transfer sheet to the textile material.

14. A method of printing textile material comprising the steps:
   providing a transfer sheet coated with a first ink component containing a soluble thickening agent;
   positioning the transfer sheet adjacent an ink jet printing apparatus containing a second ink component including a reactive dye and including a solvent suitable to at least partially dissolve the thickening agent of the first ink component;
   wherein the first ink component and second ink component comprise an ink component set, and wherein at least substantially all thickening agent in the ink component set is in the first ink component;
   operating the ink jet printing apparatus to print a selected pattern onto the transfer sheet with the second ink component;
   wetting the textile material; and
   applying the transfer sheet to the textile material to transfer at least a portion of the first ink component and at least a portion of the second ink component to the textile material, and wherein substantially all of the first component transferred is derived from the transfer sheet.

15. The method of claim 14 including at least partially dissolving the first ink component with the second ink component prior to applying the transfer sheet to the textile material.

16. A method of printing a selected pattern onto a textile material comprising the steps:
   providing a transfer sheet including a coating of a first ink component;
   positioning the transfer sheet adjacent an ink jet printing apparatus;
   operating the ink jet printing apparatus to emit onto the transfer sheet an unthickened second ink component containing a selected dye and a selected solvent in which the first ink component is soluble at room temperature, to form the selected pattern on the transfer sheet; and
   applying the transfer sheet to the textile material to transfer at least a portion of the first ink component and at least a portion of the second ink component to the textile material.

17. The method of claim 16 wherein the first ink component is unpigmented.

18. The method of claim 16 wherein the first ink component contains a thickener.

19. The method of claim 16 including mixing the first and second ink components prior to applying the transfer sheet to the textile material to form a resulting ink.

20. The method of claim 19 wherein the resulting ink is thicker than the second ink component.

21. A method of forming a transfer sheet comprising:

coating a transfer sheet with a first ink component that has an ink thickener; and operating an ink jet printing apparatus to emit a second ink component onto the transfer sheet to form a thickened resulting ink in a selected pattern, wherein the second ink component has a selected dye and a selected solvent in which the thickener is soluble.

22. A process of transferring a selected pattern onto a textile material comprising:

coating a transfer sheet with a first ink component that has an ink thickener;

operating an ink jet printing apparatus to emit a second ink component onto the transfer sheet to form a thickened resulting ink in the selected pattern, wherein the second ink component has a selected dye and a selected solvent in which the thickener is soluble; and applying the transfer sheet to the textile material to transfer the thickened resulting ink to the textile material.

23. A transfer sheet comprising:

a first ink component coated on a substrate, wherein the first ink component has an ink thickener; and a second ink component printed onto the coated substrate using an ink jet printing apparatus, wherein the second ink component has a selected dye and a selected solvent in which the thickener is soluble, wherein the first and second ink components mix on the substrate to form a thickened resulting ink in a selected pattern.

* * * * *